T867007

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 21, 1969

867 O.G. 748

825,478

DRY PROCESSED PHOTOGRAPHIC MATERIALS CONTAINING PREPROCESSING STABILIZERS

Ralph W. Baxendale and George F. L. Wood, both %
Kodak Park Division, Rochester, N.Y. 14650

Filed Mar. 28, 1969. Published Oct. 21, 1969
Int. Cl. G03c *5/30*
U.S. Cl. 96—66
No Drawing. 14 Pages Specification

The presence of a hydroxybenzoic acid compound in heat processed photographic materials improves the preprocessing stability. Such hydroxybenzoic acid compounds can be described by the formula:

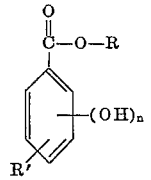

wherein R is hydrogen, alkyl, especially alkyl containing 1 to 5 carbon atoms such as methyl, ethyl, propyl, butyl and pentyl or alkali and alkaline earth metals such as lithium, sodium, potassium, calcium, strontium and barium; R′ is hydrogen, alkyl, especially alkyl containing 1 to 5 carbon atoms such as methyl, ethyl, propyl, butyl and pentyl or alkoxy, especially alkoxy groups containing 1 to 5 carbon atoms such as methoxy, ethoxy, propoxy, butoxy and pentyloxy; and *n* is 1, 2 or 3. Typical examples of such compounds include gallic acid, 2,4,6-trihydroxybenzoic acid, gentisic acid, methyl gallate, propyl gallate, and the like.

The hydroxybenzoic acids are effective as preprocessing stabilizers in materials for dry processing which comprise a photographic silver salt and a silver salt stabilizer precursor. In addition, the heat processed photographic materials can contain activator precursors and incorporated developing agents.